Nov. 12, 1963
G. J. LAURENT
3,110,897
RADIO ECHO DETECTION SYSTEM
Filed Jan. 13, 1954
5 Sheets-Sheet 1
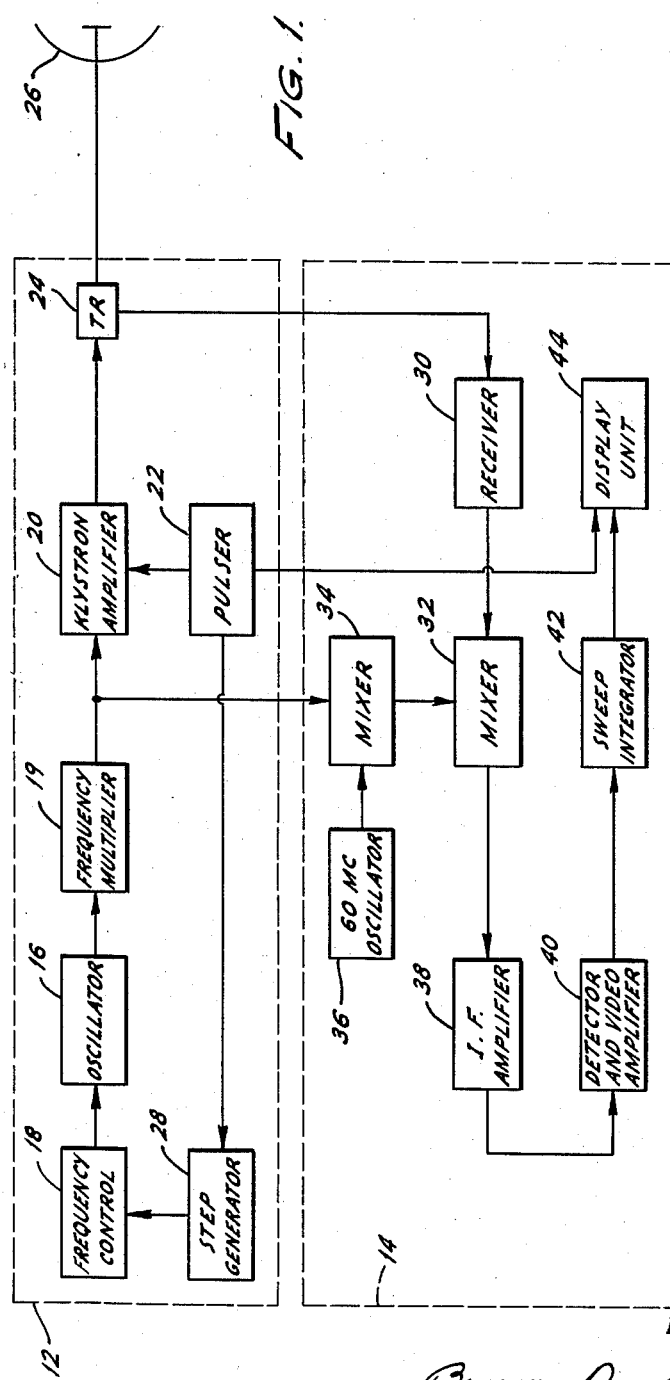
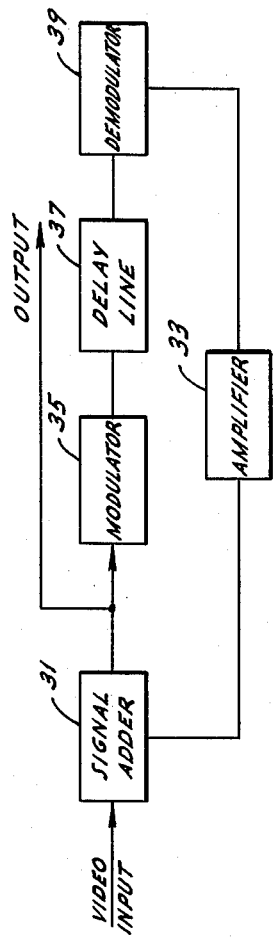
INVENTOR.
GEORGE J. LAURENT
BY
Brown, Denk & Synnestvedt
AGENTS Nov. 12, 1963
G. J. LAURENT
3,110,897
RADIO ECHO DETECTION SYSTEM
Filed Jan. 13, 1954
5 Sheets-Sheet 2
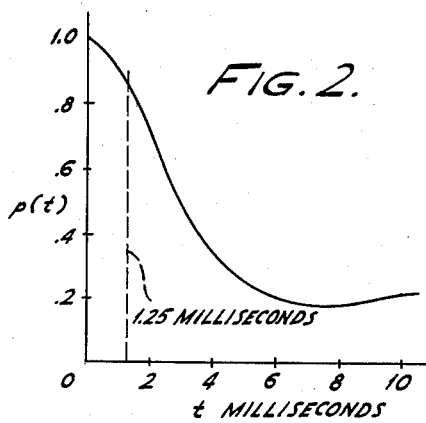
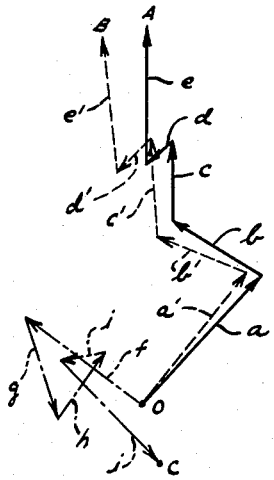
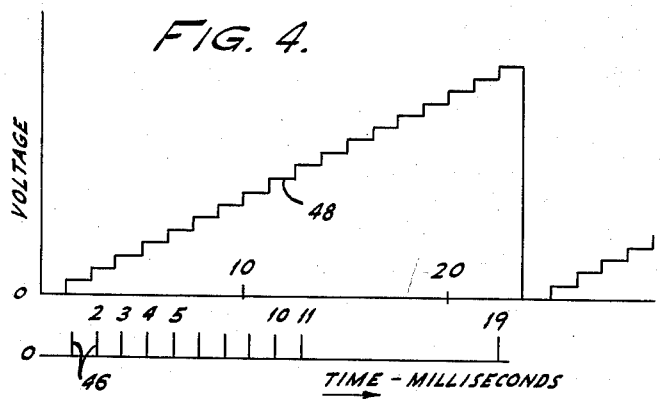
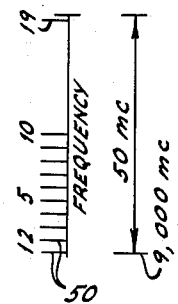
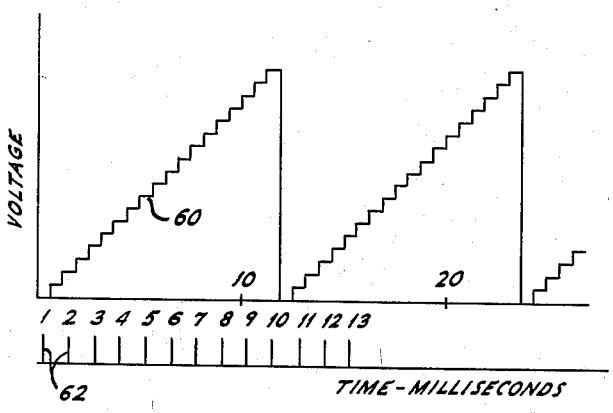
INVENTOR.
GEORGE J. LAURENT
BY
Brown, Denk & Synnestvedt
AGENTS

INVENTOR.
GEORGE J. LAURENT

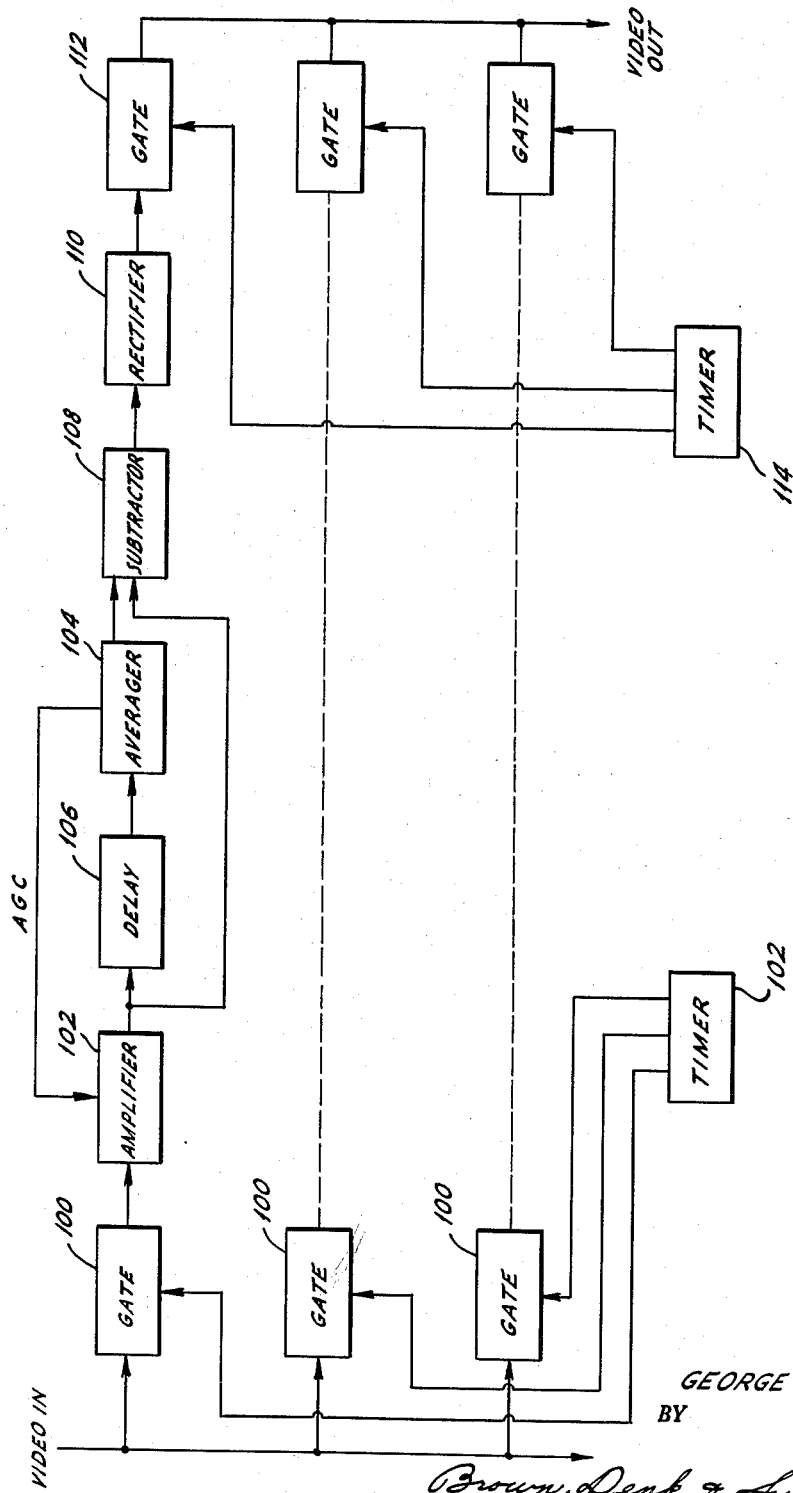

Nov. 12, 1963 G. J. LAURENT 3,110,897
RADIO ECHO DETECTION SYSTEM
Filed Jan. 13, 1954 5 Sheets-Sheet 5
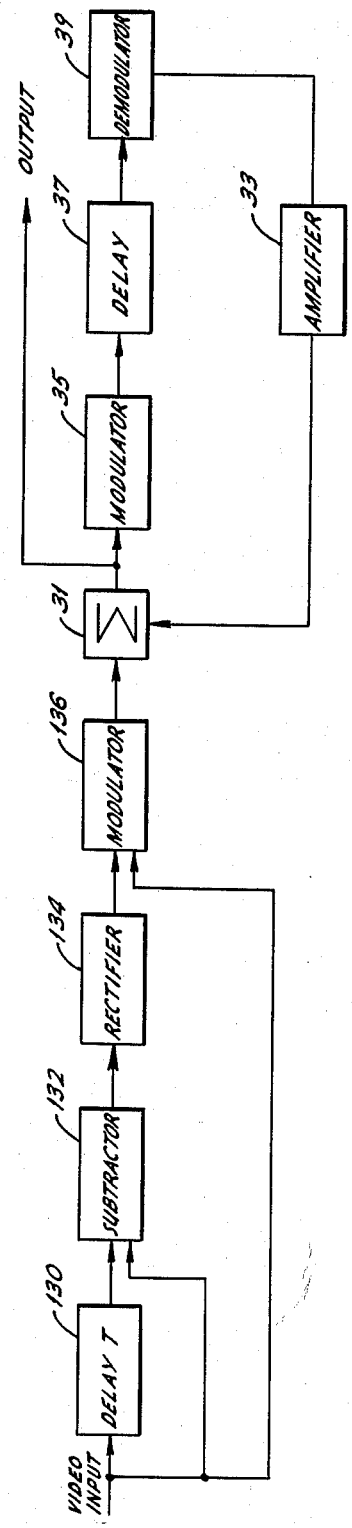
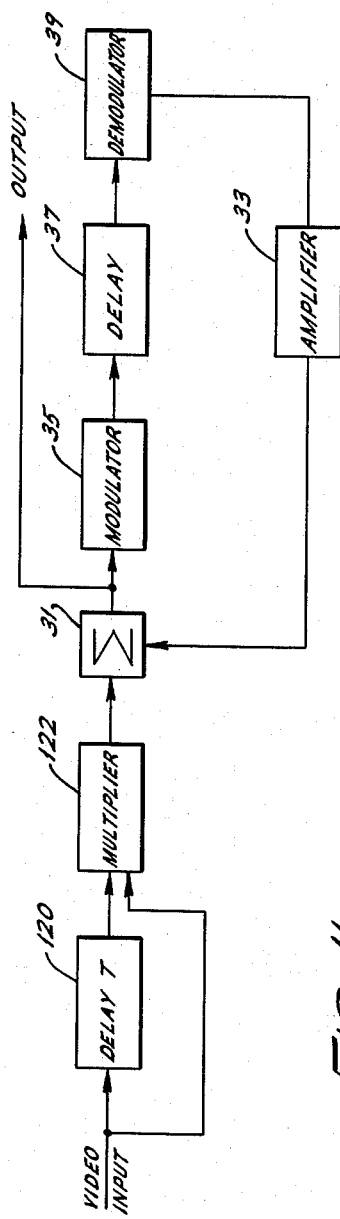
INVENTOR.
GEORGE J. LAURENT
BY
Brown, Denk & Lynnestvedt
AGENTS

United States Patent Office 3,110,897
Patented Nov. 12, 1963

3,110,897
RADIO ECHO DETECTION SYSTEM
George J. Laurent, Jenkintown, Pa., assignor, by mesne assignments, to Philco Corporation, Philadelphia, Pa., a corporation of Delaware
Filed Jan. 13, 1954, Ser. No. 403,806
17 Claims. (Cl. 343—13)

This invention relates to radio echo detection systems and more particularly to radar systems for locating objects which may be surrounded by areas which return signals to the radar system which are similar to or are stronger than the signal returned by the desired target.

The basic objective of any radar system is to convey information to the radar operator on the nature of the targets scanned by the radar system. If the radar system has for its primary mission the location of small objects on the surface of the sea, e.g. lifeboats, life rafts or snorkels of submarines operating below the surface, the echo signals received from such objects should be so processed by the radar system that a distinctive signal appears on the system indicator even though the echo signals received from such objects are much weaker than signals received from surrounding areas of the sea. Radar for navigational purposes should display salient geographical features, cities and large man-made targets. Radar employed for mapping and survey purposes should show the type of ground cover, for example scrub pine, forests or grass ground. Bombing radar should display small man-made features in great detail while retaining other information at a low level for navigational purposes during the bombing run.

Present day radar systems suffer from two main disadvantages. The first disadvantage is that the signal returned from a target varies inversely as the third or fourth power of the range to the object. For example, suppose a radar system is searching for a spherical oil stoage tank known to be located within range of the radar system. The average value of the signal returned from such an object will vary inversely as the fourth power of the range. However, the significance of the target in the mission assumed above does not change with range and the presentation of this object on the indicator of the radar system should be as nearly independent of range as possible. The second disadvantage of present day radar systems is that the amplitude distribution of a limited number of echo signals received by a fixed frequency radar system located at a substantially fixed position in space is not typical of the distribution that would be obtained from a large number of samples or from the same number of samples taken at different points in space. Since different types of targets, if properly illuminated, produce different amplitude distributions, it follows that present day radar systems fail to take advantage of all of the information potentially available in the returned echo signals.

I have discovered that the echo signals returned to a scanning radar system located at a substantially fixed point in space may be made to exhibit an amplitude distribution which is typical of the nature of the target being observed if the frequency of the radar system is changed in a preselected manner from pulse to pulse. I have discovered that this variation in amplitude may be used to improve the visibility of desired targets on the indicator screen by employing a sweep integrator either alone or in conjunction with other signal processing equipment at a point preceding the indicator.

Therefore it is an object of the present invention to provide a novel radio echo detection system for detecting small objects surrounded by strongly reflecting backgrounds.

It is a further object of the present invention to provide a radar system capable of distinguishing between reflecting areas which return signals with the same average amplitude.

Still another object of the present invention is to provide a novel radar system in which the amplitude of signals representing selected targets is substantially independent of the range to the target.

These and other objects of the invention are generally accomplished by providing a radar system in which the frequency of the exploratory pulse is changed in a preselected manner from pulse to pulse. The receiving portion of the radar system is so constructed and arranged that signals having different pulse-to-pulse amplitude distributions provide different signals to the system indicator.

I am aware that radar systems in which the frequency of the transmitted signal is changed from pulse to pulse have been suggested as a means for avoiding interfering signals. I am also aware of the fact that sweep integrators of the type hereinafter described have been employed for separating desired target signals from noise and interfering signals. However, so far as I am aware there is no teaching in the prior art of combining these two features to take advantage of the different pulse-to-pulse amplitude characteristics of different targets.

For a better understanding of the present invention together with other and further objects thereof reference should now be made to the following detailed description which is to be read in conjunction with the accompanying drawings in which:

FIG. 1 is a block diagram of one preferred form of the present invention;

FIG. 1A is a block diagram showing in greater detail a portion of the system of FIG. 1;

FIGS. 2, 3, 4 and 5 are plots which explain the operation of the system of FIG. 1;

FIG. 10 is a partial block diagram of another embodiment of the invention which is similar in function to the system of FIG. 6; and FIGS. 11 and 12 are block diagrams of two additional embodiments of the signal processing portion of the present invention.

FIG. 1 illustrates one elementary form of my invention. In FIG. 1 the transmitting portion of the radar system is included within the broken line 12 while the receiving portion is enclosed by broken line 14.

Figure 6:
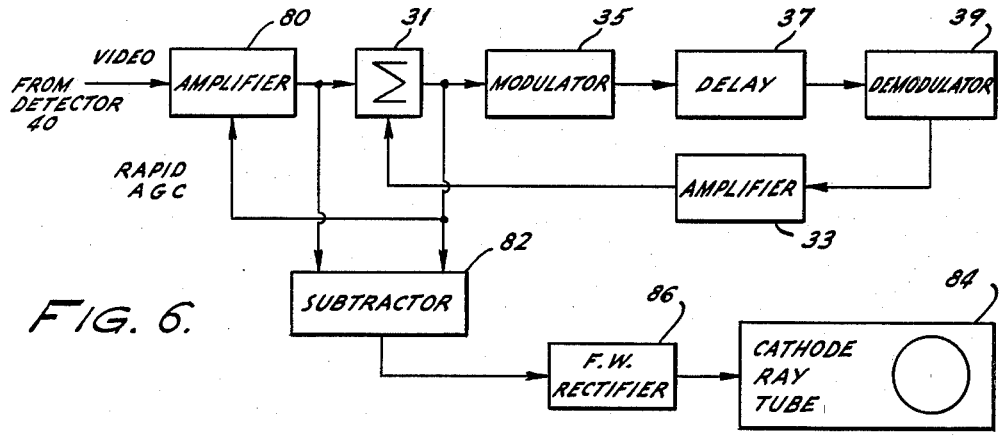
FIG. 6 is a second embodiment of a portion of the system of FIG. 1.

The transmitted signal originates in oscillator 16 which is controlled in frequency by a frequency control means 18. Oscillator 16 may be a reflex klystron oscillator, in which case frequency control 18 may be a variable voltage source associated with the repeller electrode of the oscillator tube. Alternatively oscillator 16 may be a conventional vacuum tube oscillator and frequency control 18 may be any of a number of well known forms of reactance tube frequency control circuits. The signal from oscillator 16 is supplied to a frequency multiplier 19 which may comprise a series of frequency doublers, triplers or quadruplers in cascade. The frequency multiplication provided by multiplier 19 is sufficient to raise the frequency of the signal generated by oscillator 16 to the desired frequency for radiation. The signal from multiplier 19 is supplied to a high power klystron amplifier 20 which has a bandwidth sufficient to accommodate the frequency variation introduced by control 18. In a typical example the signal supplied to amplifier 20 may have a frequency of the order of 9,000 megacycles and the frequency variation of the signal may be of the order of 50 megacycles. Klystron amplifier 20 is supplied with a second signal from pulser 22. This second signal is a series of short duration pulses occurring at the desired repetition rate of the radar system. Klystron amplifier 20 is so biased that no signal appears in its output except at such times as it is energized by pulses from pulser 22. The output pulses of the radar system, which have a carrier frequency determined by oscillator 16 and multiplier 19 and a time duration determined by the duration of the signal supplied from pulser 22, are supplied through a conventional transmit-receive device 24 to the radiating and receiving antenna 26.

Signals are also supplied from pulser 22 to a step generator 28 which controls the signal supplied by frequency control 18 to oscillator 16 in a manner described in greater detail at a later point in the specification.

The echo signals received by antenna 26 pass through transmit-receive device 24 to a receiver 30 which includes the usual radio frequency components of a radar receiver. The radio frequency signals from receiver 30 are supplied to a mixer 32 which receives a local oscillator signal from a second mixer 34. Mixer 34 is energized by a signal supplied from the output of multiplier 19, and a second signal from an oscillator 36 operating at the desired intermediate frequency of the radar system. The combination of these two signals results in the generation of a local oscillator signal which always differs from the variable frequency transmitted signal by the intermediate frequency of the system. The target echo signals, reduced to the intermediate frequency by mixer 32, are supplied to an intermediate frequency amplifier 38, and from this amplifier to a detector-video amplifier 40. Conventional circuits may be employed for IF amplifier 38 and detector-video amplifier 40; therefore these units will not be described in detail. The signal from video amplifier 40 is supplied to a sweep integrator 42. A sweep integrator is a circuit for storing information relating to received pulses and for supplying an output signal representative of the weighted average of signals received within a preselected interval of time.

FIG. 1A illustrates a widely used form of sweep integrator which stores information as a change in the amplitude of a signal which is recirculated through a delay line by coupling the output of the delay line to the input thereof. As shown in FIG. 1A, video signals from a video amplifier or the like are supplied to a signal adder circuit 31 which receives a second video signal from amplifier 33. The signal adder circuit 31 may comprise two voltage amplifier stages having a common anode load impedance or a single amplifier stage having a resistive network in the grid circuit thereof for combining the two signals supplied thereto. The combined signal from adder circuit 31 is supplied to a modulator circuit 35 which superimposes the video signal on an ultrasonic carrier wave to facilitate the passage of the video signal through the delay line 37. Delay line 37 has a delay time such that the total delay around the loop, including the circuits mentioned above and demodulator 39 which follows delay line 37, is exactly equal to the period between successive pulses supplied to amplifier 20 by pulser 22 of FIG. 1. Demodulator 39 removes the carrier frequency supplied by modulator 35 and supplies the delayed video signal to amplifier 33. The gain of amplifier 33 is such that the overall gain around the loop, including any gains or losses in circuits 31, 35 and 39 and the loss in delay line 37, is slightly less than unity. The particular value of over-all gain may vary from 0.80 to 0.95, the exact value being determined by the number of pulses to be averaged and the stability of the integrator. If P is taken as the amplitude of a presently received video echo pulse, $P_{-1}$ the amplitude of the preceding pulse etc., and G is taken as the overall gain of the sweep integrator, then the output signal obtained from adder 31 is proportional to $P + GP_{-1} + G^2 P_{-2} \ldots + G^n P_{-n}$.

The form of sweep integrator described above is the form most widely used in the art. An improved but less widely known form of sweep integrator circuit is described in the copending applications of Sunstein et al., Serial No. 281,414, filed April 9, 1952, now Patent No. 2,841,704 issued July 1, 1958 and Sunstein, Serial No. 400,179, filed December 24, 1953, now Patent No. 2,736,021 issued Feb. 21, 1956; and assigned to the assignee of the present invention. This type of sweep integrator stores intelligence as a shift in frequency of the recirculating signal. There are many advantages in employing a frequency modulated sweep integrator of the type disclosed in the two above-identified applications since this type of sweep integrator generally has a better over-all performance for the same or fewer components.

Returning now to FIG. 1, the signal from sweep integrator 42 is supplied to a display unit 44 which preferably consists of the usual intensity modulated indicator tube having a range sweep in one direction and an azimuth sweep in a second direction. The display may be either in rectangular coordinates or in polar coordinates as desired. A connection is made from pulser 22 to display unit 44 for providing means for synchronizing the sweeps of the display unit with the transmitted pulses of the radar system.

In order that full advantage may be taken of the information contained in these and later drawings, the reader should keep in mind certain facts regarding the operation of a sweep integrator. As indicated above, a sweep integrator is an averaging device which stores echo signals resulting from successively transmitted pulses and provides an output signal which is proportional to a weighted average of the stored signals. In order for a sweep integrator to be able to improve the detectability of a target it is necessary that the echo signals representing the target remain substantially constant from pulse to pulse while the extraneous signals mixed with the desired target signals vary in amplitude in a random manner. This condition is met when the extraneous signals comprise atmospheric and circuit noise signals. Earlier researchers in the art believed that the surface of the sea changed in a random manner and the sweep integrator was proposed as a means for detecting small targets on the surface of the sea. However, for reasons heretofore unknown or not fully understood, the employment of sweep integrators did not provide the expected increase in the ability to detect targets in the presence of sea return. I have discovered that the reason a radar system employing a sweep integrator does not provide the expected improvement in target detectability is that the signals returned from an area of the sea do not exhibit the truly random amplitude distribution necessary for optimum operation of a sweep integrator. Measurements of the return from an area of the sea indicate that there is a definite correlation that exists between the amplitudes of signals returned within a time period of 6 to 20 milliseconds duration. That is, if the configuration of the surface of the sea is such that a large signal is returned from the surface of the sea to the radar system, it is to be expected that the signal returned in response to the next transmitted pulse will also be very large.

FIG. 2 is a plot of the correlation function $p(t)$ as a function of time for a moderately rough sea. Under typical operating conditions for a conventional radar system, as many as 6 or 8 relatively large signals may be returned from the particular illuminated target area before the surface of the sea has changed by a sufficient amount to cause an appreciable change in amplitude of the returned signal. When it is considered that a scanning radar system having a relatively narrow beamwidth may illuminate a given area of the sea for only 20 or 30 transmitted pulses, it is easy to see that the 6 or 8 large pulses returned from the sea will give rise to an average signal in the output of the sweep integrator which is comparable in amplitude to the average signal returned by another area of the sea containing a small target. I have discovered that the correlation between successive signals returned from an area of the sea may be reduced and the operation of the sweep integrator correspondingly improved by changing the pulse-to-pulse frequency of the radar system by a controllable amount.

Although the system shown in FIG. 1 is not limited to a particular set of operating parameters, it is believed that the invention will be better understood if illustrative operating parameters are now assumed and hereinafter used in describing the invention. Therefore it will be assumed that the radar system of FIG. 1 operates with a transmitted frequency which varies from 9,000 to 9,050 megacycles, that the pulse repetition frequency of the radar system is 800 pulses per second and that the duration of each transmitted pulse is ½ microsecond. It will be assumed further that the antenna 26 produces a beam 3.6° wide and that the antenna makes 20 revolutions per minute. Under these assumed conditions, a target will be illuminated for 30 milliseconds and a pulse will be transmitted every 1.25 milliseconds. Therefore the radar system will illuminate a small target with 24 pulses for each revolution of the antenna 12. In the description of the invention which follows, it will be assumed that only the pulses lying within the ½ power points of the radar system contribute to the integrated output signal. It has been shown recently that this is not an entirely valid assumption but the error introduced by this assumption does not affect the validity of the description of the present invention.

From the plot of FIG. 2, it can be seen that if an echo signal of unity amplitude is received from the surface of the sea at time zero in FIG. 2, a pulse of the same frequency received 1.25 milliseconds later may be expected to have an amplitude comparable to the previous pulse. The physical basis for this experimentally determined relationship is illustrated by the vector diagram of FIG. 3. It is assumed in the vector diagrams of FIG. 3 that the return from an illuminated area of the sea is made up of the individual returns from five different sub-areas. The term "illuminated area" as used herein refers to the area instantaneously illuminated by the radar system. This area has a width determined by the beam-width of the radar antenna and the distance of the area from the radar system. The length of this area in range is determined by the pulse width of the radar system. Therefore the length of the "illuminated area" may be only a fraction of a mile even though the radar system scans over a distance of several miles for each transmitted pulse. The signals returned from these sub-areas will be different in amplitude and phase as a result of the different orientation of the surface of these sub-areas with respect to the radar antenna and the different electrical distances of these sub-areas from the radar system. In FIG. 3 signals returned from the various sub-areas have been designated as vectors $a$, $b$, $c$, $d$ and $e$, respectively. The net signal returned from the total area of the sea will be equal in amplitude to a vector drawn from a point of origin O to point A at the terminus of vector $e$. On the following transmitted pulse, the range and attitude of the reflecting sub-areas will have changed slightly so that the returns from these sub-areas will be represented by the vectors $a'$ through $e'$. The net signal returned to the radar system for this pulse may be represented by a vector drawn from point O to B. It should be noted that the vectors OA and OB are of approximately equal length as predicted by the plot of FIG. 2. It should be understood that vectors OA and OB represent the amplitude of the radar video signal at only one instant of time or at one particular range. Several such large amplitude signals may be received during any one range sweep but, since they would occur at different ranges, they would be treated as independent signals in the sweep integrator. The vectors $f$, $g$, $h$, $i$ and $j$ in FIG. 3 represent the returns from the reflecting sub-areas in response to a pulse which is transmitted at the same time as the pulse which gave rise to vectors $a'$ through $e'$ but which has a transmitted frequency which is different from the frequency of the transmitted signal which gave rise to the vectors $a$ through $e$. In drawing vectors $f$ through $j$, it has been assumed that the change in frequency was not sufficient to affect materially the amplitude of the signal returned from each sub-area. However, even a relatively small change in frequency results in a considerable difference in the relative electrical distances to each of the reflecting sub-areas so that the net signal may have an amplitude which is represented by a vector drawn from point O to point C. It should be obvious to anyone familiar with the operation of a sweep integrator system that the average of the signal OA and OC will give a much smaller net output than the average of signal OA and OB.

It might be assumed that the change in frequency of the transmitted signal would result in a decrease in the integrated amplitude of signals returned by a small target located within the illuminated area of the sea. However, experimental tests have shown that the reflected signal from a small area target is not greatly affected by changes in frequency of the transmitted signal and this is so even though the echo signal reflected from the target is made up of a direct reflection from a target to the radar system and a reflection which follows a path from the target to the surface of the sea and then back to the radar system.

FIG. 4 is a series of waveforms illustrating the typical time and frequency relationship present in the system of FIG. 1. In FIG. 4, pulses 46 represent the pulses supplied by pulser 22 to klystron amplifier 20 and display unit 44. These pulses have been numbered sequentially in the order of their occurrence. Preferably the pulses supplied to amplifier 20 are delayed for a small interval, for example a quarter of a millisecond, with respect to the pulses supplied to step generator 28 to permit oscillator 16 to stabilize at each new frequency before amplifier 20 is keyed on to generate a transmitted pulse. This delay is illustrated in FIG. 4 by the small time interval between the leading edge of each of the steps in waveform 48, which is generated by generator 28, and the next occurring pulse 46. As shown in FIG. 4, waveform 48 rises by equal increments in response to each applied pulse. Circuits for generating a signal of this type are illustrated in volume 19, chapter 8 of Radiation Laboratory Series, McGraw-Hill Book Company, Inc., 1949.

It has been assumed in drawing FIG. 4 that the output signal from generator 28 increases for 19 steps and then repeats this variation in a cyclic manner. The number of steps in each cycle should be selected with reference to the length of time that each target is illuminated, the bandwidth of the klystron amplifier 20 and the frequency shift from pulse to pulse necessary to provide decorrelation of successive signals. Experimental evidence indicates that it is preferable to shift the frequency from pulse to pulse by an amount at least equal to the reciprocal of the width of the transmitted pulse in order to provide decorrelation of successive echo signals. This frequency shift should be considered as a minimum and a greater frequency variation employed if the components of the radar system permit. In FIG. 4 it has been assumed that the bandwidth of klystron amplifier 20 is 50 megacycles and that frequency control 18 responds to the signal from generator 28 in a manner to shift the transmitted frequency over this entire band. Therefore the frequency change from pulse to pulse will be of the order of 2½ megacycles, which is greater than the reciprocal of the pulse width of a ½ microsecond pulse. The relative frequencies of successive transmitted pulses are shown at 50 in FIG. 4. Pulses 50 are numbered to correspond to pulses 46 which caused their generation in amplifier 20. As shown in FIG. 4, pulse 1 has a frequency of approximately 9,000 megacycles, pulse 2 a frequency of 9,002.5 megacycles and pulse 19 a frequency of 9,045 megacycles. Pulse 20 will again have a frequency of 9,000 megacycles and the frequency variation of the transmitted pulses will vary in the same cyclic manner every 19 pulses. Under the conditions assumed, a small target illuminated by a radar system having the parameters given above will be illuminated twice by pulses of the same frequency during each radar scan— that is pulses 1 through 5 and pulses 20 to 24, respectively, will be of the same transmitted frequency. However, these pulses are spaced apart by approximately 24 milliseconds so that very little correlation is to be expected between pulse 1 and pulse 20 for example. The successive echo signals returned from areas of the sea which do not contain a target will vary in a random fashion during the period that that particular area is being illuminated by the radar system. Because the amplitude of the signal varies in a random manner, the weighted average of the signals returned from any particular area of the sea will be substantially equal to the weighted average signal returned from any other area of the sea. Therefore the signal supplied by sweep integrator 42 to display unit 44 will have a substantially uniform amplitude in the absence of a target within the field of view of the radar system. The display unit 44 may be adjusted to cause this signal to be marginally visible on the screen of the indicator tube.

If the radar system illuminates an area of the sea containing a target, a constant amplitude echo signal resulting from the reflection of energy from the target will be superimposed on the randomly varying signal resulting from the reflection of the energy from the surface of the sea. Sweep integrator 42 will respond to this constant amplitude component and will supply a signal of greater amplitude to display unit 44 during the time that the target is illuminated by the radar system. This increase in signal will result in the appearance of a bright spot on the screen of the indicator at the range and azimuth corresponding to the location of the target.

To avoid any possible confusion, it should be emphasized here that applicant's invention does not lie in causing the sweep integrator 42 to provide a greater output signal when a target signal is received, rather the invention lies in so arranging the radar system that only signals received from specific targets cause this increase in signal. In the present invention, spurious signals resembling true target signals but actually resulting from a fortuitous configuration of the surface of the sea are eliminated.

It is within the scope of the present invention to modify the number of steps provided by step generator 28 during each cycle to equal 25 or more so that a small target is not illuminated by the same frequency more than once on each scan. However, such a change in the number of steps would require either that the bandwidth of klystron amplifier 20 be increased by a comparable amount or the pulse-to-pulse frequency change of the transmitted signals reduced. The overall bandwidth of klystron 20 may be increased by stagger tuning the cavities. The pulse-to-pulse variation in frequency may be reduced without lowering the performance of the system by increasing the duration of the transmitted pulse. It is impractical to attempt to establish optimum relationships between pulse width, frequency variation from pulse to pulse, etc. for all possible uses of the radar system. However, these relationships may be very easily derived once the operation of the present invention is fully understood.

A slightly modified condition of operation of the system in FIG. 1 is illustrated in FIG. 5. In this embodiment of the invention it is assumed that pulser 22 supplies twice as many pulses to step generator 28 as it supplies to klystron amplifier 20 and display unit 24. Waveform 60 of FIG. 5 illustrates the output of step generator 28 under these newly assumed conditions. It will be noted that waveform 60 contains 19 steps each having a rise equal to the rise of the 19 steps included in waveform 48 in FIG. 4. Since several forms of step generators are known in the art which recycle after a predetermined number of pulses have been supplied thereto, it will generally be unnecessary to make any modifications of step generator 28 to produce the waveform 60 rather than the waveform 48 of FIG. 4. The pulses supplied to amplifier 20 and display unit 44 are illustrated at 62 in FIG. 5. It will be noted that these pulses correspond in time spacing to pulses 46 of FIG. 4. The relative frequency of the transmitted pulses is illustrated by the plot 64 of FIG. 5. Again, the transmitted pulses 64 are numbered to correspond to the pulses 62 which caused their generation in amplifier 20. Attention is called to the fact that the frequency spacing between successive pulses is twice the spacing shown in FIG. 4. This results from the fact that two steps are produced in waveform 60 for each transmitted pulse. Transmitted pulses 1 through 10 are generated on the first and successive odd steps of the first cycle of waveform 60. Since there are an odd number of steps in waveform 60, the waveform 60 will begin a new cycle immediately after the transmission of pulse 10 of plot 62. Pulse 11 occurs on the second step of the second cycle of waveform 60 shown in FIG. 5. Therefore the transmitted pulse 11 shown in 64 will have a frequency midway between the frequency of pulses 1 and 2. Pulses 12 through 19 occur on successive even steps in the second cycle of waveform 60. The mode of operation illustrated by FIG. 5 has the advantage that the pulse-to-pulse frequency difference is twice that of FIG. 4, thereby assuring a complete decorrelation from pulse to pulse. The time spacing between the pulses transmitted on the same frequency is the same in FIG. 5 as in FIG. 4—that is, pulse 1 and pulse 20 will be transmitted on the same frequency under the conditions assumed for FIG. 5 and under the conditions assumed for FIG. 4. The mode of operation illustrated by FIG. 5 has the further advantage that, if the pulse-to-pulse variation between successive pulses is greater than the bandwidth of the radar IF amplifier 38, second round echoes will not appear in the input of detector and video amplifier 40. Second round echoes are echo signals resulting from a particular transmitted pulse which are received by a radar system at a time following the transmission of the next transmitted pulse. Since second round echo signals will not pass through intermediate frequency amplifier 38 due to the variation in frequency from pulse to pulse, the time spacings between successive transmitted pulses may be decreased to provide a corresponding increase in the information gathering rate of the radar system. Again a compromise must be made since the number of pulses transmitted per second cannot be increased without a corresponding decrease in the interval between transmission of pulses on the same frequency. However, it is believed that in most instances it will be possible to decrease materially the spacing between successively transmitted pulses without adversely affecting the decorrelation provided by the radar system of the present invention.

It should be obvious to those skilled in the art that, by varying the ratio of the number of pulses supplied by pulser 22 to amplifier 20 and step generator 28 respectvely, other arrangements of relative frequency of successive pulses may be obtained. For example, step generator 28 may be arranged to generate three steps for each transmitted pulse, and the number of steps to chosen that transmitted pulses 7 and 14, for example, are equally spaced in frequency between transmitted pulses 1 and 2. Another modification falling within the scope of the present invention comprises replacing step generator 28 with a trigger circuit which provides a programmed change of potential at its output. This programmed signal causes the frequency of the transmitted pulses to be distributed in a random manner throughout the frequency band of the amplifier 20.

It will be obvious to those skilled in the art that the system of FIG. 1 is subject to many other modifications which fall within the scope of the present invention. For example, it would fall within the scope of the present invention to replace oscillator 16, frequency multiplier 19 and klystron amplifier 20 with a suitable high power pulsed oscillator having means incorporated therein to change the frequency of oscillation from pulse to pulse. Another possible modification of the system of FIG. 1 comprises replacing step generator 28, frequency control 18 and oscillator 16 with a series of oscillators operating at slightly different frequencies and a switching means for connecting these oscillators in a predetermined sequence to frequency multiplier 19 or to amplifier 20. Another possible modification consists of replacing klystron amplifier 20 with a traveling wave tube or other suitable amplifier.

As pointed out above, the decorrelation of the echo signals received from the surface of the sea by changing the frequency of the system from pulse to pulse greatly improves the operation of the sweep integrator and causes the improvement in target detectability provided by this circuit to approach theoretical limits predicted but never achieved by earlier researchers. However, even the novel system of FIG. 1 fails to take full advantage of the amplitude distribution of signals returned from various targets. That is, it responds only to the average value of a target signal and not to the pulse-to-pulse variation.

FIG. 6 is a modified form of the system of FIG. 1 which does take advantage of the pulse-to-pulse variation in amplitude. Only the portion of the system which follows detector 40 is shown in FIG. 6 since the remainder of the system may be identical to that shown in FIG. 1. Also, blocks 31, 33, 35, 37 and 39 represent units of the sweep integrator of the type illustrated in FIG. 1A. In FIG. 6, the video signal from detector 40 of FIG. 1 is supplied to a variable gain amplifier 80. Amplifier 80 may comprise one or more variable $\mu$ triode stages arranged so that the gain of a signal passing therethrough is determined by the bias supplied to the control grid. Alternatively, the amplifier may include one or more stages employing a 6AS6 pentode or the like in which the signal to be amplified is applied to the one control grid and the gain control signal is applied to a second control grid. In the circuit of FIG. 6, the gain control signal is taken from the output of signal adder 31. The signal path from signal adder 31 to amplifier 80 should have a short time constant and a very short delay time in order that the gain control signal may follow the video frequency variations which occur during each radar sweep. The delay should be short in order that the gain for a particular target signal supplied to amplifier 80 may be controlled by the component of the integrated signal in the output of signal adder 31. If the delay introduced by signal adder 31 and the signal path from the output thereof to the gain control electrode of amplifier 80 is unavoidably of the order of a pulse length, it may be desirable to insert an additional delay in the last-mentioned signal path which is equal to a pulse repetition period minus the unavoidable delay. This may be accomplished by deriving the gain control signal from the output of demodulator 39 instead of from signal adder 31. The output of amplifier 80 is supplied to one input of signal adder 31. The output of amplifier 80 is supplied also to one input of subtractor circuit 82. Subtractor circuit 82 may be a differential amplifier circuit or any of the circuits mentioned in connection with the description of signal adder 31 with the addition of an inverter stage in series with one input.

The output signal of the sweep integrator, which appears at the output of signal adder 31, is supplied to a second input of subtractor circuit 82. The output of subtractor circuit 82 is supplied to an indicator 84 through a full wave rectifier 86. Indicator 84 may be an intensity modulated indicator of the B or PPI types or it may be an indicator which is capable of displaying the pulse-to-pulse variation in amplitude for ten or more successive pulse trains.

Figure 7:
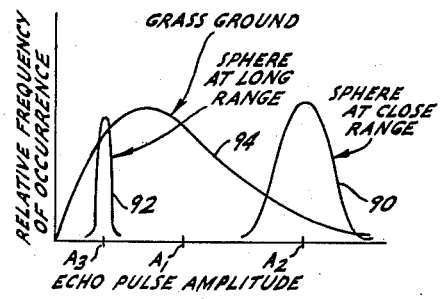
FIGS. 7, 8 and 9 are plots which illustrate the operation of the system of FIG. 6.
Figure 8:
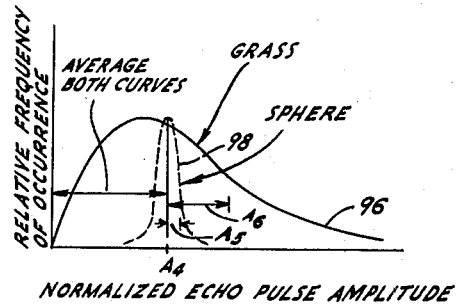

The operation of the system of FIG. 6 will be explained with reference to FIGS. 7 and 8. FIG. 7 is a plot showing the amplitude distribution of successive echo signals received by a radar system of the type shown in FIG. 1 for three targets. One target, represented by curve 90, is a sphere at close range plus some ground return or thermal noise, the second, represented by curve 92, is a similar sphere at long range and the third, represented by curve 94, is grass ground at some arbitary range. It has been found that the amplitude distribution for grass ground approximates a Rayleigh distribution. The average amplitude for this distribution is shown at $A_1$ in FIG. 7. The average amplitude for the sphere at short range is shown at $A_2$ and for the sphere at long range at $A_3$. It should be noted that the value $A_3$ is much less than the value $A_2$ even though the spheres are identical. If the signals represented by the plot of FIG. 7 are supplied directly to a conventional intensity modulated indicator, the sphere at close range will produce a bright spot, the grass ground a spot of intermediate intensity and the sphere at long range a very dim spot. Therefore, while the position of the spots on the indicator screen may give an indication of the range and azimuth to the targets, the intensity of the spots provide no reliable indication as to the nature of the target.

Assume now that the signals represnted by the plot of FIG. 7 are supplied to amplifier 80 of FIG. 6. The system shown in FIG. 6 will act to equalize the average values of the signals from the three targets. The averaging is performed by the sweep integrator portion of the system of FIG. 6 and the averages are equalized by amplifier 80. The signals in the output of amplifier 80 are now represented by the plot of FIG. 8. The signals returned from the grass ground are represented by the curve 96 which has an average amplitude $A_4$. Curve 96 has the same shape as curve 94 of FIG. 7 except for a possible change in the abscissa scale. Both spheres are represented by curve 98 which also has an average value $A_4$. Curve 98 is similar to curves 90 and 92 except for changes in abscissa scales. It should be noted that the gain control signal does not remove the pulse-to-pulse variations in amplitude within a single sweep or the pulse-to-pulse variation of a given target on successive sweeps. The time constant of the sweep integrator circuit limits the action of amplifier 80 to equalizing the average values of the signals passing therethrough. The signals appearing at the output of subtractor 80 are pulses having an amplitude equal to the difference between the average value $A_4$ and the instantaneous amplitude of the pulses appearing at the output of amplifier 80. These pulses may be either positive or negative depending on the direction of the instantaneous deviation from average of the signal appearing at the output of amplifier 80. Rectifier 86 converts these signals into pulses of one polarity while preserving the magnitude of the pulses. It should be remembered that, in the situation now under consideration, three pulses will occur in the output of subtractor 82 and rectifier 86 on each radar sweep since all three targets are assumed to lie at different ranges. On any one sweep the two signals in the output of subtractor 82 which represent the two spheres may not be equal but the averages of a large number of such signals will be equal. The signals appearing at the output of rectifier 86 are supplied to the intensity control electrode of indicator 84. The phosphor screen of the indicator averages or integrates the received pulses and produces an illuminated spot having an intensity equal to the average value thereof. This is not the average value of the unprocessed video signal supplied to amplifier 80 but it is the average of the rectified difference signals from subtractor 82. Indicator 84 may be so arranged that zero signal input produces a bright spot on the indicator and signals of progressively higher amplitudes produce progressively lower intensity indications. Under these conditions, the spheres will produce bright spots on the screen of the indicator since the average amplitude of the signals representing the spheres is relatively low as is illustrated by the distance $A_5$ in FIG. 8. The average of the signals representing the grass ground is shown as distance $A_6$ in FIG. 8.

It should now be clear to the reader that the presentation appearing on the screen of indicator 84 represents the positions of targets by their location on the screen and the nature of the target by the intensity of the indication. Furthermore, the intensity of the illumination is determined solely by the reflection characteristics of the target and it is not affected by changes in range to the target.

Figure 9:
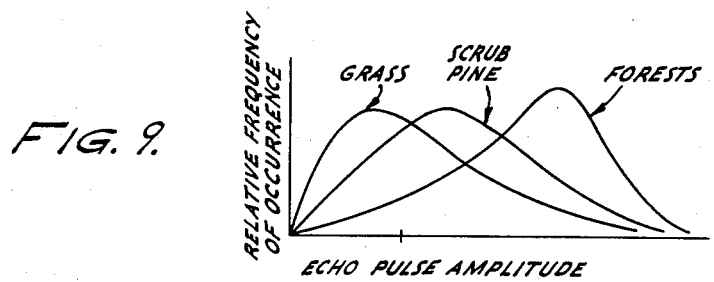

FIG. 9 is a plot showing the reflection characteristics of three different ground covers. An area of the earth's surface containing these three types of ground cover would be represented on the screen of indicator 84 as a shaded map in which the shading or variation in intensity is representative of the type of ground cover in a particular area.

FIG. 10 is the range gate and filter equivalent of the sweep integrator system of FIG. 6. The video signal from detector 40 of FIG. 1 is supplied to a plurality of range gates 100. These range gates are gated on in sequence at intervals of the order of a pulse width by signals received from a timer 102. Gate circuits are now widely used in radar and television systems, but for the benefit of those not familiar with this art it is suggested that they may comprise a pentode amplifier tube in which the video signal is supplied to the control grid and a positive pulse is supplied to the screen or suppressor grid at the instant the video signal is to appear at the output of the gate circuit. Alternatively a boxcar circuit comprising a diode bridge circuit and a storage capacitor may be employed to perform the gating operation. This latter circuit has the advantage that it provides an energy gain in the form of pulses of the same amplitude but of longer duration. The signal from the first gate 100 is supplied to a variable gain amplifier 102 which performs the same function as amplifier 80 of FIG. 6. However, amplifier 102 receives only one signal per sweep whereas amplifier 80 received all echo signals for each sweep. The signal from amplifier 102 is supplied to an averaging circuit 104 through a short delay means 106. The function of delay means 106 is to exclude the pulse currently being amplified from the AGC loop. Averager 104 may be a relatively large capacitor shunted with an appropriate resistor. A gain control signal is supplied by averager 104 to amplifier 102. A subtractor circuit 108, which corresponds to subtractor circuit 82 of FIG. 6, receives input signals from averager 104 and amplifier 102 respectively. The bipolar pulses appearing at the output of subtractor 108 are converted to unipolar pulses by rectifier 110 in order that the indicator (not shown in FIG. 10) may be energized by the average of the magnitudes of the deviations. The output of rectifier 110 is supplied to a gate circuit 112 which is rendered operative to pass signals at preselected times by signals received from a timer 114. With the circuit shown in FIG. 10 it is desirable to energize gate 112 at the same frequency as gate 100 in order that all difference pulses may be averaged on the screen of the indicator. However, under some circumstances it may be advantageous to insert a second averager circuit after rectifier 110 and then energize gate 112 at a very slow rate. This will result in a reduction in the bandwidth of the signal in the output of gate circuits 112 without any loss of signal intelligence. For a detailed explanation of this feature reference should be made to the copending application of David E. Sunstein, Serial No. 325,407, filed December 11, 1952 and assigned to the assignee of the present invention. As indicated above, one channel of the type described above is provided for each increment of range that is to be separately displayed on the indicator.

FIGS. 11 and 12 represent two other video signal processing systems which employ a sweep integrator. The sweep indicator portions of these two systems have been numbered to correspond to the showing of FIG. 1A.

In the system of FIG. 11, video signals from detector 40 of FIG. 1 or any similar source are supplied to a delay means 120 and to one input of a multiplier 122. The signals supplied to delay means 120 are supplied to a second input of multiplier 122 after a delay of one interpulse period. The output of multiplier 122 is supplied to signal adding circuit 31 in the sweep integrator. Other forms of averaging devices such as a range gate and filter system may be substituted for the sweep integrator of FIG. 11. It can be shown that the system of FIG. 11 provides a response which decreases as the pulse-to-pulse correlation of the received signal decreases.

The system of FIG. 12 provides sharper discrimination between signals of different pulse-to-pulse correlation characteristics. In the system of FIG. 12 the unprocessed video signals are supplied to a delay means 130 and to one input of a subtractor circuit 132. The signals supplied to delay means 130 are supplied to a second input of subtractor 132 after a delay of one interpulse period. The output of subtractor 132 is connected to a full wave rectifier 134 which converts the bipolar signals appearing at the output of subtractor circuit 132 to unipolar pulses having magnitudes proportional to the magnitude of the pulse-to-pulse variation in amplitude of the unprocessed radar video signals. The unprocessed video signals are supplied to one input of a modulator 136. Modulator 136 is again a form of amplifier circuit in which the gain is a function of the amplitude of an applied control signal. In the system of FIG. 12 the control signal is supplied by rectifier 134. This signal is supplied so as to reduce the gain of modulator 136 as the amplitude of the signal from rectifier 134 increases. The output of modulator 136 is supplied to a suitable averaging device which is again shown as a sweep integrator. The circuit shown in FIG. 12 has a relative high output for signals which do not vary in amplitude from pulse to pulse. Many manmade objects return signals of this nature. However, the output of the circuit of the system of FIG. 12 drops sharply with any variation in the amplitude of signals from pulse to pulse. Therefore background signals such as seat return and ground clutter would be largely eliminated by the system of FIG. 12.

While there have been described what are at present believed to be the preferred embodiments of the invention it will be obvious to those skilled in the art that many changes and modifications may be made therein without departing from the spirit and scope of the hereinafter appended claims.

What is claimed is:

1. A radar system comprising means for generating a series of short duration pulses of high frequency energy, means for radiating said pulses in the direction of the area to be searched, means for changing from one pulse to the next the carrier frequency of said pulses in a predetermined manner, means for receiving a corresponding series of groups of echo signals from the area to be searched, individual echo signals within each of said groups resulting from the reflection of said transmitted pulses from individual objects and subareas within said area to be searched, amplifier-detector means associated with said signal receiving means for providing corresponding groups of video signals representing the amplitude of the signals returned by said objects and subareas, means for combining corresponding individual video signals from a selected plurality of successive groups to provide groups of composite video signals, the amplitudes of individual composite video signals being dependent on the amplitude distribution of the echoes returned by said objects and subareas, and an indicator means responsive to said composite video signals for providing an indication of the amplitudes thereof.

2. The radar system of claim 1 wherein said means for combining corresponding individual video signals nals, a sweep integrator associated with said amplifier-detector means for averaging a predetermined number of video signals corresponding to successive transmitted pulses, and means responsive to the output of said sweep integrator for providing an indication of the instantaneous magnitude of the signal supplied by said sweep integrator.

10. A radar system comprising means for generating a series of short duration pulses of high frequency electromagnetic energy, means for radiating said pulses in the direction of the area to be searched and for receiving echo signals of said transmitted pulses reflected from said area to be searched, means for changing the frequency of said transmitted electromagnetic energy from pulse to pulse, the characteristics of said frequency changing means being such that the interval between successive pulses of the same frequency is long compared to the time required for the single frequency auto-correlation curve of said echo signals to fall to approximately zero, amplifier-detector means associated with said means for receiving echo signals for providing a video signal representative of the instantaneous amplitude of said echo signals, a sweep integrator associated with said amplifier-detector means for averaging a predetermined number of video signals corresponding to successive transmitted pulses, and means responsive to the output of said sweep integrator for providing an indication of the instantaneous magnitude of the signal supplied by said sweep integrator.

11. A radar system for detecting relatively small targets comprising means for generating a series of short duration pulses of high frequency electromagnetic energy, scanning antenna means for radiating said pulses in the direction of the area to be searched and for receiving echo signals reflected from said area to be searched, the scanning of said antenna causing each region of the area to be searched to be illuminated by a predetermined number of said transmitted pulses, means for cyclically changing the frequency of said electromagnetic energy from pulse to pulse, the characteristic of said last-mentioned means being such that no two pulses within a cycle have the same frequency, the number of pulses in each cycle being a large fraction of said predetermined number illuminating a region of the area to be searched, amplifier-detector means associated with said antenna means for providing a video signal representative of the instantaneous amplitude of said echo signals, a sweep integrator associated with said amplifier-detector means for averaging a predetermined number of video signals corresponding to successive transmitted pulses, said last-mentioned predetermined number being not greater than the predetermined number of pulses illuminating each region of the area to be searched, and means responsive to the output of said sweep integrator for providing an indication of the instantaneous magnitude of the signal supplied by said sweep integrator.

12. A radar system comprising means for generating a series of short duration pulses of high frequency energy, means for changing from one pulse to the next the carrier frequency of said pulses by an amount equal to the reciprocal of the pulse width, means for radiating said pulses in the direction of the area to be searched, means for receiving a corresponding series of groups of echo signals from the area to be searched, individual echo signals within each of said groups resulting from the reflection of said transmitted pulses from individual objects and subareas within said area to be searched, amplifier-detector means associated with said signal receiving means for providing corresponding groups of video signals representing the amplitude of the signals returned by said objects and subareas, means responsive to said video signals for providing a signal dependent upon the amplitudes of individual video signals in at least two successive groups, and an indicator responsive to said last-mentioned signal for providing a display indicative of the time variation of a characteristic of said last-mentioned signal.

13. A radar system comprising means for generating a series of short duration pulses of high frequency electromagnetic energy, means for radiating said pulses in the direction of the area to be searched and for receiving echo signals of said transmitted pulses reflected from said area to be searched, means for changing the frequency of said electromagnetic energy from pulse to pulse, amplifier-detector means associated with said means for receiving echo signals for providing a video signal representative of the instantaneous amplitude of said echo signals, a sweep integrator associated with said amplifier-detector means for averaging a predetermined number of video signals corresponding to successive transmitted pulses, and means responsive to the output of said sweep integrator for providing an indication of the variation in magnitude within a period of the signal supplied by said sweep integrator.

14. A radar system comprising means for generating a series of short duration pulses of high frequency energy, means for radiating said pulses in the direction of the area to be searched, means for changing from pulse to pulse the carrier frequency of said pulses, means for receiving a corresponding series of groups of echo signals from the area to be searched, individual echo signals within each of said groups resulting from the reflection of said transmitted pulses from individual objects and subareas within said area to be searched, amplifier-detector means associated with said signal receiving means for providing corresponding groups of video signals representing the amplitude of the signals returned by said objects and subareas, means for combining corresponding individual video signals from a selected plurality of successive groups to provide groups of composite video signals, the amplitudes of individual composite video signals being proportional to the weighted average of said corresponding individual video signals in said selected plurality of successive groups, and an indicator means responsive to said composite video signals for providing an indication of the amplitudes of said individual composite video signals.

15. A radar system comprising means for generating a series of short duration pulses of high frequency energy, means for radiating said pulses in the direction of the area to be searched, means for changing from one pulse to the next the carrier frequency of said transmitted pulses, means responsive to energy reflected from individual objects and subareas within said area to be searched for providing groups of individual video signals representing the amplitude of the signals returned by said objects and subareas, means responsive to said groups of video signals for producing a second series of groups of video signals, individual video signals within groups of said second series having amplitudes dependent upon the group-to-group variation in amplitude of corresponding individual video signals in said first series of groups of video signals, means for combining corresponding individual video signals from a selected plurality of successive groups of said second series to provide groups of composite video signals, and an indicator means responsive to said composite video signals for providing an indication of the amplitude thereof.

16. A radar system comprising means for generating a series of short duration pulses of high frequency energy, means for changing from one pulse to the next the carrier frequency of said transmitted pulses, means for radiating said pulses in the direction of the area to be searched, means responsive to energy reflected from individual objects and subareas within said area to be searched for providing groups of individual video signals representing the amplitudes of the signals returned by said objects and subareas, means responsive to said individual video signals for equalizing the average value of all said individual video signals, said average being taken over a preselected number of groups of said video signals, means for producing a second series of groups of video signals, individual video signals within groups of comprises means for producing composite video signals proportional to the weighted sum of corresponding individual video signals from a selected plurality of successive groups of said video signals.

3. The radar system of claim 2 wherein said means for producing said composite video signals comprises a sweep integrator.

4. A radar system comprising means for generating a series of short duration pulses of high frequency energy, means for radiating said pulses in the direction of the area to be searched, means for changing from one pulse to the next the carrier frequency of said pulses in a predetermined manner, means for receiving a corresponding series of groups of echo signals from the area to be searched, individual echo signals within each of said groups resulting from the reflection of said transmitted pulses from individual objects and subareas within said area to be searched, amplifier-detector means associated with said signal receiving means for providing corresponding groups of video signals representing the amplitude of the signals returned by said objects and subareas, means responsive to said groups of video signals for producing a second series of groups of video signals, individual video signals within groups of said second series having amplitudes dependent upon the group-to-group variation in amplitude of corresponding individual video pulses in the first series of groups of video signals, means for combining corresponding individual video signals from a selected plurality of successive groups of said second series to provide groups of composite video signals, and an indicator means responsive to said composite video signals for providing an indication of the amplitudes thereof.

5. A radar system comprising means for generating a series of short duration pulses of high freequency energy, means for changing from one pulse to the next the carrier frequency of said generated pulses, means for radiating said pulses in the direction of the area to be searched, means for receiving a corresponding series of groups of echo signals from the area to be searched, individual echo signals within each of said groups resulting from the reflection of said transmitted pulses from individual objects and subareas within said area to be searched, amplifier-detector means associated with said signal receiving means for providing corresponding groups of video signals representing the amplitude of the signals returned by said objects and subareas, an amplifier means having a gain dependent upon the amplitude of a control signal supplied thereto, means connecting the output of said amplifier-detector means to the imput of said amplifier means, means responsive to the output of said amplifier means for producing a signal proportional to the average of at least one individual video signal over a preselected number of successive groups, means connecting the output of said averaging means to said amplifier means to control the gain thereof, subtractor means associated with said amplifier means and said everaging means for providing a signal proportional to the magnitude of the instantaneous difference between the output of said averaging means and the output of said amplifier means at least during the occurrence at the output of said amplifier means of said one video signal, and indicator means responsive to the output of said subtractor means.

6. A radar system comprising means for generating a series of short duration pulses of high frequency energy, means for changing from one pulse to the next the carrier frequency of said generated pulses, means for radiating said pulses in the direction of the area to be searched, means for receiving a corresponding series of groups of echo signals from the area to be searched, individual echo signals within each of said groups resulting from the reflection of said transmitted pulses from individual objects and subareas within said area to be searched, amplifier-detector means associated with said signal receiving means for providing corresponding groups of video signals representing the amplitude of the signals returned by said objects and subareas, an amplifier means having a gain dependent upon the amplitude of a control signal supplied thereto, means connecting the output of said amplifier-detector means to the input of said amplifier means, a sweep integrator responsive to the output of said amplifier means, means connecting the output of said sweep integrator to said amplifier to control the gain thereof in accordance with the instantaneous amplitude of the signal at the output of said sweep integrator, subtractor means associated with said amplifier means and said sweep integrator for providing a signal proportional to the magnitude of the instantaneous amplitude difference between the output signals of said sweep integrator and the output of said amplifier means and an indicator means responsive to the output of said subtractor means.

7. A radar system comprising means for generating a series of short duration pulses of high frequency energy, means for changing from one pulse to the next the carrier frequency of said pulses, means for radiating said pulses in the direction of the area to be searched, means for receiving a corresponding series of groups of echo signals from the area to be searched, individual echo signals within each of said groups resulting from the reflection of said transmitted pulses from individual objects and subareas within said area to be searched, amplifier-detector means associated with said signal receiving means for providing corresponding groups of video signals representing the amplitude of the signals returned by said objects and subareas, a plurality of amplifier means each having a gain dependent upon the amplitude of a control signal supplied thereto, gating means coupling the output of said amplifier-detector means to the inputs of said plurality of amplifier means, averaging means associated with the output of each of said amplifier means, means coupling the output of each averaging means to the amplifier means associated therewith to control the gain thereof, subtractor means associated with each of said amplifier means and said averaging means for providing signals proportional to the magnitude of the instantaneous amplitude differences between the output signals of associated amplifier means and averaging means, an indicator for displaying said difference signals, and gating means coupling said subtractor means to said indicator.

8. A radar system comprising means for generating a series of short duration pulses of high frequency energy, means for changing from one pulse to the next the carrier frequency of said pulses, means for radiating said pulses in the direction of the area to be searched, means for receiving a corresponding series of groups of echo signals from the area to be searched, individual echo signals within each of said groups resulting from the reflection of said transmitted pulses from individual objects and subareas within said area to be searched, amplifier-detector means associated with said signal receiving means for providing corresponding groups of video signals representing the amplitude of the signals returned by said objects and subareas, means responsive to said video signals for producing a signal dependent upon the amplitudes of individual video signals in at least two successive groups, and an indicator responsive to said last-mentioned signal for providing a display indicative of the time variation of a characteristic of said last-mentioned signal.

9. A radar system comprising means for generating a series of short duration pulses of high frequency electromagnetic energy, means for radiating said pulses in the direction of the area to be searched and for receiving echo signals of said transmitted pulses reflected from said area to be searched, means for changing the frequency of said electromagnetic energy from pulse to pulse, amplifier-detector means associated with said means for receiving echo signals for providing a video signal representative of the instantaneous amplitude of said echo sigsaid second series having amplitudes dependent upon the difference between the amplitudes of individual signals in corresponding groups of said first series and the amplitude of corresponding averaged video signals, and an indicator means responsive to said difference signals for providing an indication of the amplitude of the average magnitude of the difference.

17. A radar system comprising means for generating a series of short duration pulses of high frequency energy, means for changing from one pulse to the next the carrier frequency of said transmitted pulses, means for radiating said pulses in the direction of the area to be searched, receiving means responsive to echo signals resulting from the reflection of said transmitted pulses from individual objects and subareas within the area to be searched for providing a first series of groups of individual video signals representing the amplitudes of the signals returned by said objects and subareas, averaging means associated with said receiving means for providing a group of averaged video signals, each averaged video signal in said group having an amplitude proportional to the weighted average of a corresponding individual video signal taken over a preselected number of groups of said first series, subtracting means associated with said averaging means and said receiving means for providing a second series of individual video pulses, individual video pulses in said second series having an amplitude proportional to the difference between the amplitude of a corresponding individual video pulse in a group of said first series and the corresponding averaged video signal, and indicator means responsive to the output of said subtractor means.

References Cited in the file of this patent
UNITED STATES PATENTS

| | | |
|---|---|---|
| 2,422,133 | Sanders | June 10, 1947 |
| 2,487,995 | Tucker | Nov. 15, 1949 |